(12) United States Patent
Mate et al.

(10) Patent No.: US 7,171,845 B2
(45) Date of Patent: Feb. 6, 2007

(54) APPARATUS FOR MEASUREMENT OF FRICTION FORCE AT THE INTERFACE OF A SLIDER AND ROTATING DISK

(75) Inventors: Charles Mathew Mate, San Jose, CA (US); Robert N. Payne, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 235 days.

(21) Appl. No.: 11/059,290

(22) Filed: Feb. 16, 2005

(65) Prior Publication Data
US 2006/0179927 A1    Aug. 17, 2006

(51) Int. Cl.
G01B 5/28    (2006.01)
(52) U.S. Cl. ....................................................... 73/105
(58) Field of Classification Search ...................... 73/9, 73/105
See application file for complete search history.

(56) References Cited

U.S. PATENT DOCUMENTS

| | | | |
|---|---|---|---|
| 6,196,062 B1 * | 3/2001 | Wright et al. .................. | 73/105 |
| 6,229,664 B1 | 5/2001 | Albrecht et al. | |
| 6,536,265 B1 * | 3/2003 | Hanchi et al. ................. | 73/105 |
| 6,751,063 B2 | 6/2004 | Payne et al. | |
| 6,762,909 B2 | 7/2004 | Albrecht et al. | |

FOREIGN PATENT DOCUMENTS

JP        56003436 A2    1/1981
JP        08315354 A2    11/1996

OTHER PUBLICATIONS

J. Itoh, et al., "An Experimental Investigation for Continuous-contact Recording Technology," IEEE Trans. on Magnetics, vol. 37, No. 4 Jul. 2001, p. 1806.
C.M. Mate et al., "Dynamics of Contacting Head-Disk Interfaces", IEEE Trans. Magn. 40 (2004) 3156-3158.
U.V. Nayak et al., "An Overview of Glide Testing", IEEE Transactions on Magnetics, vol. 39, No. 2, Mar. 2003, pp. 729-734.
G.P. Singh et al., "A Novel Wear-in-Pad Approach to Minimizing Spacing at the Head/Disk Interface", IEEE Trans. Magn. 40 (2004) 3148-3152.

* cited by examiner

*Primary Examiner*—Robert Raevis
(74) *Attorney, Agent, or Firm*—Thomas R. Berthold

(57) ABSTRACT

A slider-disk interface tester for measuring the friction force at the interface uses a "negative-pitch" slider in contact with a rotating disk. The tester includes a base that supports a motor for rotating the disk and an actuator for supporting the slider and moving it to a desired radial location on the disk surface. The slider is connected to the actuator by a rigid arm and a suspension like the suspension used in disk drives. When the disk is rotating, the negative-pitch slider has its upstream or leading portion in contact with the disk surface and its downstream or trailing portion not in contact with the disk surface. A contact pad is located at the leading portion of the slider and is in contact with the disk surface. The tester includes a friction-force sensor and associated measurement circuitry, such as strain gauge, piezoelectric and temperature sensors, and is located at one of several locations on the rigid arm, suspension or slider.

18 Claims, 6 Drawing Sheets

APPARATUS FOR MEASUREMENT OF FRICTION FORCE AT THE INTERFACE OF A SLIDER AND ROTATING DISK

BACKGROUND OF THE INVENTION

1. Field of the Invention

This invention relates in general to an apparatus for testing the interface of a slider and rotating disk, and more particularly to a slider-disk interface tester for measuring the friction force at the interface.

2. Description of the Related Art

Slider-disk interface testers, also called "head-disk interface" or HDI testers, are used in the development and manufacturing of magnetic recording disk drives. Such testers typically include a spindle motor with a removable chuck or clamp that allows a magnetic recording disk to be installed, and an actuator with an attached suspension onto which the slider that supports the read/write slider is mounted. The actuator can move the slider in a programmed pattern, which may represent a typical seek pattern during operation of the disk drive, or can maintain the slider over a particular region of the disk. The tester is thus able to simulate the operation of the disk drive and enables various mechanical properties of the interface to be determined, including wear of the slider and disk, fly height of the slider and friction forces. The slider-disk interface testers may use linear or rotary actuators, including rotary voice-coil-motor (VCM) actuators similar to those used in conventional disk drives.

In current disk drive technology, the slider that supports the read/write head is an air-bearing slider that "flies" extremely close, e.g., less than about 10 nm, above the surface of the rotating disk. For future disk drives, the sliders are likely to be in actual contact with the disk surfaces for a significant period of time at high speed, e.g., up to about 100 m/s. Under these conditions, it becomes important to control the friction force acting on the slider and disk to ensure that it is small enough and substantially uniform around the disk so as not to interfere with reading and writing of data. The measurement of friction force at the slider-disk interface is also important for testing various disk and slider materials during disk drive development to ensure that they will have suitable wear properties for disk drive applications, and for measuring the shear forces on thin (e.g., less than about 10 nm) solid overcoat films used on the surfaces of the slider and disk and liquid lubricant films used on the disk surface.

One approach for measuring the friction force has been to use a slider-disk interface tester with an air-bearing slider having a "positive pitch", with the slider trailing portion in contact with the rotating disk. Positive pitch means that the leading portion of the slider, i.e., the "upstream" portion facing the air flow induced by the rotating disk, is farther from the disk surface than the "downstream" or trailing portion. However, this approach has the disadvantage that the moment generated by the friction force rotates the trailing portion away from the disk surface, which can momentarily lift the slider off the disk surface. Frequently, this leads to a steady-state-oscillation or "bounce" where the slider continually goes in and out of contact with the rotating disk, making it impossible to reliably measure the friction force during contact. The problem of bounce in contact-recording disk drives has been described by C. M. Mate et al., "Dynamics of Contacting Head-Disk Interfaces", IEEE Trans. on Magnetics, vol. 40 (2004) pp. 3156–3158.

What is needed is a slider-disk interface tester for use during development and manufacturing of future disk drives and their components that accurately and reliably measures the friction force acting between a slider and rotating disk.

SUMMARY OF THE INVENTION

The invention is a slider-disk interface tester that uses a "negative-pitch" slider in contact with the rotating disk and a friction-force sensor for measuring friction force at the interface. The tester includes a base that supports a motor for rotating the disk and an actuator for supporting the slider and moving it to a desired radial location on the disk surface. Either the motor or the actuator is movable on the base so the distance between the rotational axis of the motor and the actuator can be adjusted. The slider is connected to the actuator by a rigid arm and a suspension like the suspension used in disk drives. When the disk is rotating, the negative-pitch slider has its upstream or leading portion in contact with the disk surface and its downstream or trailing portion not in contact with the disk surface. A contact pad is located at the leading portion of the slider and is in contact with the disk surface. The contact pad makes contact with the disk surface upstream of the pivot point, i.e., the point where the load beam of the suspension applies a loading force to the slider, which allows the friction force applied to the slider from the rotating disk to generate a moment about the pivot point that tends to urge the contact pad into contact with the disk surface, thereby minimizing slider bounce.

The friction-force sensor is one of several types of sensors and associated measurement circuitry, such as strain gauge, piezoelectric and temperature sensors, and is located at one of several locations on the rigid arm, suspension or slider.

For a fuller understanding of the nature and advantages of the present invention, reference should be made to the following detailed description taken together with the accompanying figures.

DETAILED DESCRIPTION OF THE INVENTION

Figure 1:
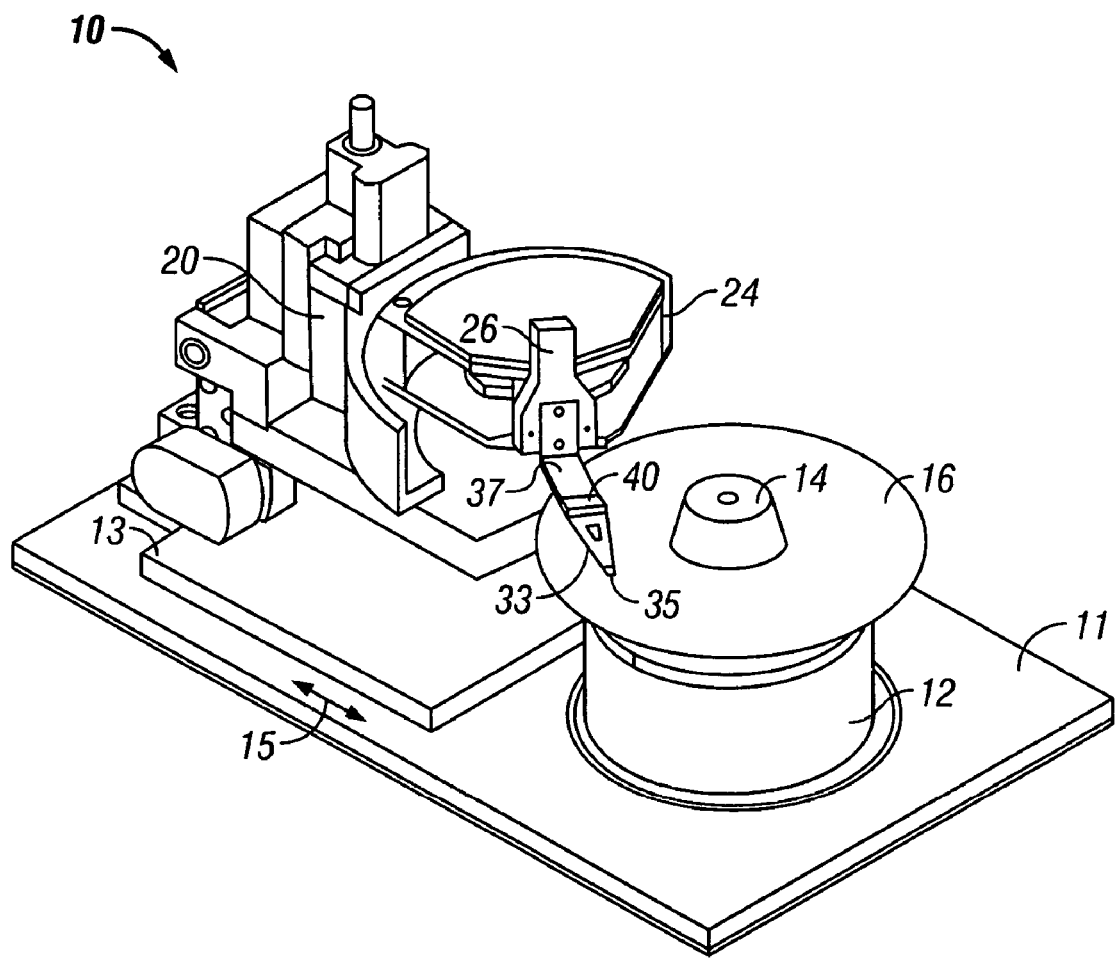
FIG. 1 is a perspective view of the slider-disk interface tester according to the present invention.

Referring first to FIG. 1, the slider-disk interface tester 10 according to the present invention is illustrated in a perspective view. The tester 10 includes a base 11 which supports a spindle motor 12 and an adjustable actuator stage 13. The spindle motor 12 has a removable disk clamp 14 that enables various types and sizes of disks to be installed on the spindle motor 12. A typical disk 16 to be tested is shown mounted on the spindle motor 12 for rotation about an axis perpendicular to the base 11.

The actuator stage 13 is movable in the linear direction shown by arrow 15. An actuator platform 20 with a height adjustment mechanism is mounted on the stage 13 and movable in the direction generally perpendicular to the surface of disk 16. A rotary voice coil motor (VCM) actuator 24 is mounted on the actuator platform 20. The VCM actuator 24 includes an arm-mounting-platform 26 and a rigid arm 37. The suspension 33 and the slider 35 to be tested are attached to the rigid arm 37. Rotation of the VCM actuator 24 enables the slider 35 to be positioned at any desired radial location on the surface of disk 16. The actuator stage 13 in combination with the actuator platform 20 enable the VCM actuator to be moved both parallel and perpendicular to the surface of disk 16. This enables the VCM actuator 24 to be located at the precise location relative to the disk 16 to enable true simulation of the disk drive slider-disk interface being tested. While the distance between the rotational axis of the disk 16 and the VCM actuator 24 along a line substantially parallel to the surface of the disk 16 is adjustable by having the spindle motor 12 fixed to the base 11 and the stage 13 movable on the base 11, the stage 13 could be fixed to the base 11 and the spindle motor 12 mounted to a movable stage on the base 11.

The slider-disk interface tester includes a sensor 40 for measuring the friction force at the interface of the slider 35 and the surface of disk 16. The sensor 40 may be any one of several types of sensors and associated measurement circuitry and may be located at different locations on the rigid arm 37, suspension 33 or slider 35, as will be explained in detail below for the specific embodiments.

The above-described tester, but without the friction-force sensor 40, is described in U.S. Pat. No. 6,229,664. This type of tester, and other known testers that provide spindle motors and actuator stages that allow different disks and sliders to be supported for testing, is usable with the present invention.

Figure 2:
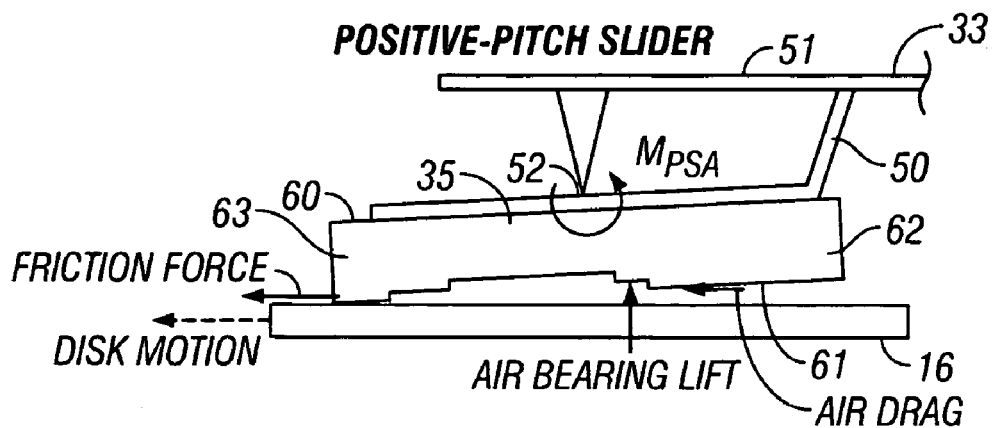
FIG. 2 is a side view of a positive-pitch slider in contact with a rotating disk as used in a slider-disk interface tester for measuring friction force according to the prior art.

The prior art slider-disk interface tester for measuring the friction force at the interface used a positive-pitch slider. FIG. 2 is a side view of the positive-pitch slider 35 in contact with rotating disk 16 as part of the tester. The suspension 33 includes a flexure 50 attached to the top side 60 of slider 35 and a load beam 51 that applies a load force and a moment $M_{PSA}$, called the "pitch static attitude" moment, to the top side 60 of the slider 35 at the pivot point 52. Both the suspension load force and $M_{PSA}$ tend to urge the trailing portion 63 of the slider 35 into contact with the disk 16. The leading portion 62 of the slider 35 is raised above the disk 16 due to the air-bearing lift acting on the slider's disk-facing side 61 that has the air-bearing surface (ABS). The friction force acting on the slider 35 at the trailing portion 63, due to the contact between the slider trailing portion 63 and the rotating disk 16, generates a moment about the pivot point 52 that is opposite to MPSA. This moment tends to urge the trailing portion 63 off the disk 16, and thus contributes to slider bounce. This bounce makes it impossible to measure the friction force at the interface.

The slider-disk interface tester according to the present invention uses a "negative-pitch" slider with its leading portion in contact with the rotating disk. A negative-pitch slider for continuous contact recording in a magnetic recording disk drive is described in pending application U.S. Ser. No. 10/953,717, filed Sep. 28, 2004, titled "DISK DRIVE WITH NEGATIVE-PITCH SLIDER FOR CONTACT RECORDING", and assigned to the same assignee as this application.

Figure 3:
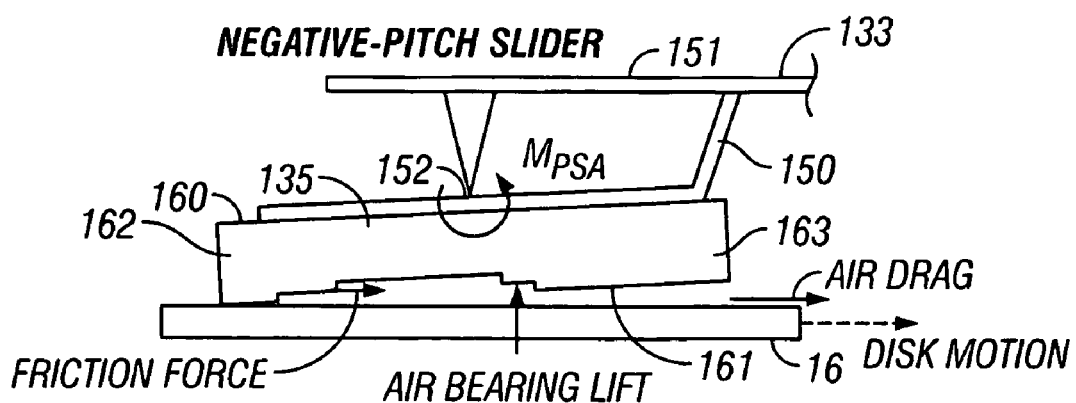
FIG. 3 is a side view of the negative-pitch slider in contact with a rotating disk as used in a slider-disk interface tester for measuring friction force according to the present invention.

A negative-pitch slider has its leading portion, i.e., the portion upstream or facing the air flow induced by the rotating disk, pitched down so that it is closer to the disk surface than the trailing portion. FIG. 3 is a side view of the negative-pitch slider 135 in contact with a rotating disk 16 and illustrates the advantage of the invention over the tester with the positive-pitch slider depicted in FIG. 2. The suspension 133 includes a flexure 150 attached to the slider 135 and a load beam 151 that applies a load force and a moment $M_{PSA}$, called the "pitch static attitude" moment, to the top side 160 of the slider 135 at the pivot point 152. Both the suspension load force at the pivot point 152 and $M_{PSA}$ (if the moment is oriented counter-clockwise as shown in FIG. 3) on the top side 160 of the slider 135 tend to urge the leading portion 162 of the slider 135, i.e., that portion that faces the air flow coming in the direction of the arrow, into contact with the disk 16. (If $M_{PSA}$ is oriented clockwise, the ABS should be designed with a suitable negative-pressure pocket to generate a moment to counter $M_{PSA}$ and urge the leading portion 162 of the slider 135 into contact with the disk 16.) The downstream or trailing portion 163 of the slider 135 is raised above the disk 16 due to the air-bearing lift acting on the ABS on disk-facing surface 161. However, unlike the positive-pitch slider in FIG. 2, the friction force acting on the slider at the leading portion 162, due to the contact between the slider leading portion 162 and the rotating disk 16, generates a counter-clockwise moment about the pivot point 152. This moment tends to urge the leading portion 162 of the slider 135 toward the disk, thus minimizing slider bounce. Since the disk motion for the negative-pitch slider is opposite to that for the positive-pitch slider, the friction force and the resulting moment act in the opposite direction as well. Consequently, the friction moment about the suspension pivot point 152 of the negative-pitch slider 135 acts to maintain the leading portion in contact with the rotating disk 16. Since there is no bounce, the friction force can be accurately and reliably measured.

Figure 4:
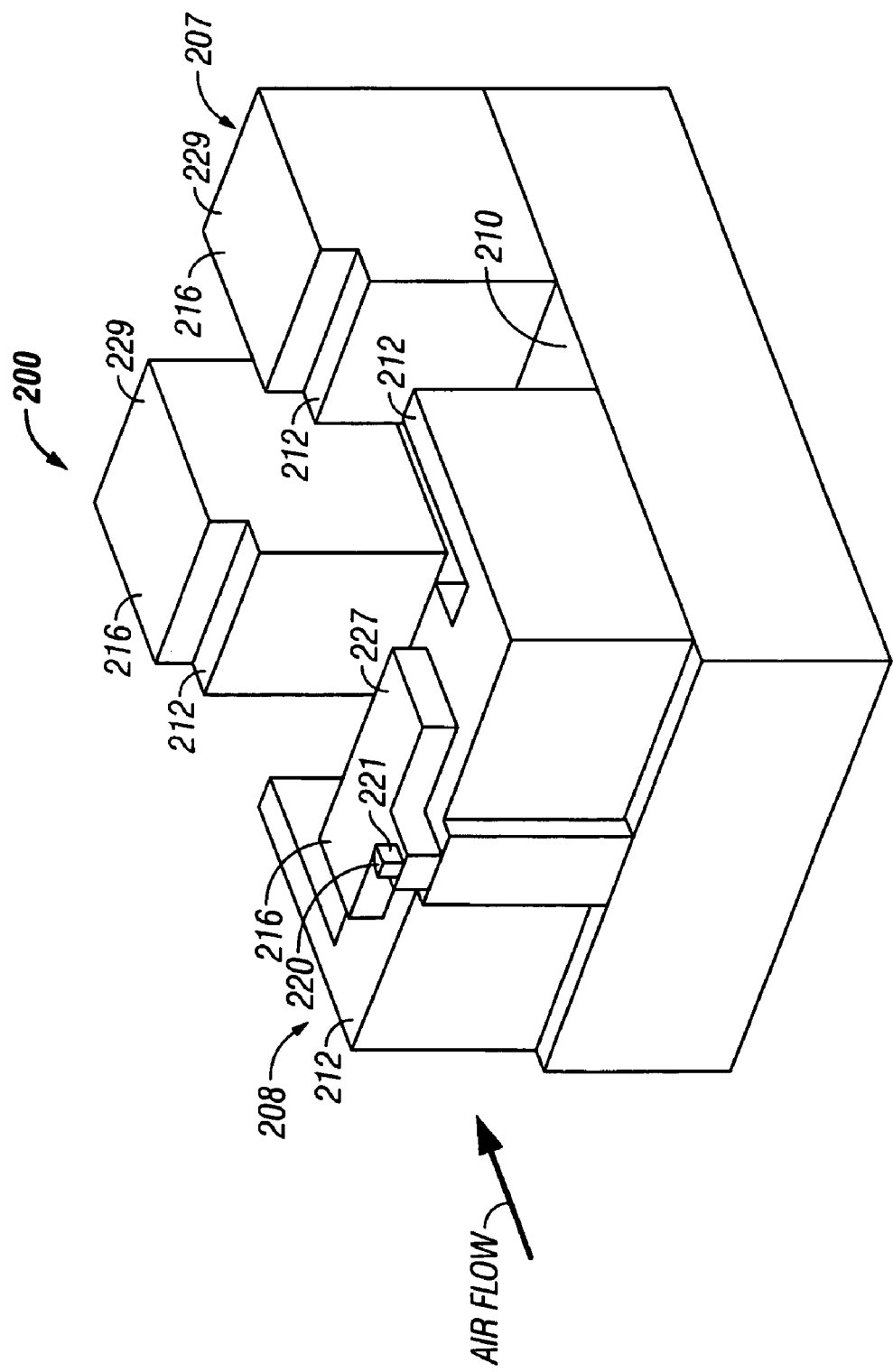
FIG. 4 is a perspective view showing the disk-facing side of a negative-pitch slider with a contact pad used in the tester of the present invention.

FIG. 4 is a perspective view showing the disk-facing side of a negative-pitch slider 200 used in the tester of the present invention and oriented relative to the direction of air flow shown by the arrow. This negative-pitch slider 200 includes an optional protrusion or contact pad 221 at the slider leading portion 208 that makes contact with the rotating disk. A conventional slider design starts off with a flat polished surface from which a patterned air-bearing surface (ABS) is created by a removal process such as etching or ion milling. The slider 200 has a rear or trailing portion 207 and a front or leading portion 208 and is formed using a dual etch with three surface levels 210, 212, 216. The surface 216 is the ABS and includes front air-bearing pad 227 and rear air-bearing pads 229. While two read pads 229 are shown, the slider may have only a single rear pad on the trailing portion. A third etch is then performed to produce a fourth surface level 220. The depth of the third etch produces the protrusion or contact pad 221 on surface 216. The top surface 220 is now the end of a small contact pad 221 that protrudes beyond the surface 216. A conventional slider, such as a "pico" slider, has length, width and height dimensions of 1.2 mm by 1.0 mm by 0.3 mm. For a slider of that size, the height of surface 216 above surface 212 is approximately 180 nm, and the height of surface 220 above surface 216 is approximately 10 nm. The purpose of pad 221 is to reduce the magnitude of the friction force and to provide a well-defined area of contact. For this particular ABS design, the pad 221 is brought into contact with the disk by reducing the disk speed until the slider flying height is less than the disk take-off-height. Another way the slider 200 can be brought in and out of contact with the disk is by changing the moment $M_{PSA}$ that the suspension exerts on the slider body, for example, by adjusting the height of the suspension above the disk surface (called the "Z-height") as described in the previously-cited paper by C. M. Mate et al. This can be done by use of adjustable actuator platform 20.

The body of slider 200 may be made of any one of various materials, which is important if it is desired to evaluate the effect of the friction force on a specific material. Typical materials used for disk drive sliders include alumina ($Al_2O_3$), $TiC/Al_2O_3$ composite, and silicon, which may also make up the contact pad 221. Also, the contact pad 221 may be coated with a material different from the material composition of the slider body. These coating materials may include wear-resistant materials, such as diamond-like carbon (DLC) and silicon nitride.

Figure 5A:
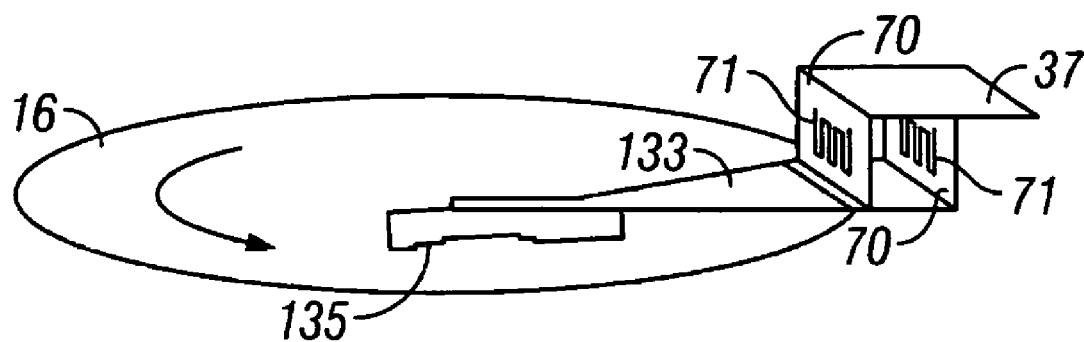
FIGS. 5A–5B show a first embodiment of the tester wherein the friction-force sensor is a strain gauge and associated measurement circuitry.
Figure 5B:
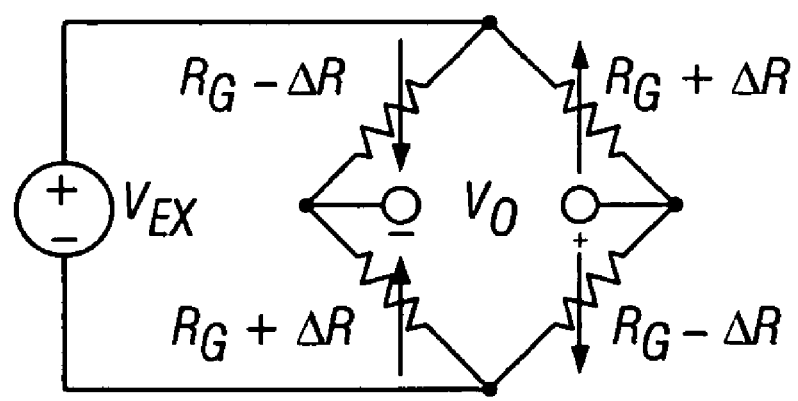

FIGS. 5A–5B show a first embodiment of the tester wherein the sensor 40 (FIG. 1) is a strain gauge and associated measurement circuitry. Two thin cantilevers 70 are located between the suspension 133 and the rigid arm 37 and oriented with their planes substantially perpendicular to the surface of disk 16 and perpendicular to the direction of the friction force from the rotating disk 16. A strain gauge 71 is located on each surface of each cantilever 70, for a total of four strain gauges. The double cantilever arrangement prevents the suspension 133 from tilting when the cantilevers 70 bend due to the friction force. When the slider 135 is loaded on the disk 16, the friction force acting on the slider 135 from the rotating disk 16 causes the two cantilevers 70 to bend an amount proportional to the friction force.

The electrical resistance of a strain gauge is proportional to the strain $\epsilon$ on the cantilever surfaces. When no friction force is applied, a strain gauge has resistance $R_G$. When a friction force is applied to the slider the strain at the surfaces of the bending cantilevers induces a change in resistance $\Delta R = GF*\epsilon$ in the strain gauge, where GF is the "Gain Factor" of the strain gauge. The strain gauges on opposite sides of a cantilever experience opposite strains, so that when a friction force causes the cantilever to bend, the resistance changes are $+\Delta R$ for the side that stretches and $-\Delta R$ for the side that compresses. The four strain gauges are wired as the four legs of a Wheatstone Bridge circuit shown in FIG. 5B. This circuit then gives an output voltage $V_0 = -V_{EX}*(\Delta R/R_G)$ that is proportional to the-friction force. $V_0$ can be calibrated by applying a known lateral force to the slider body and measuring the output voltage that corresponds to that force. FIG. 5A shows a specific structure where four strain gauges 71 are located on two cantilevers 70 at the connection of the suspension 133 and the rigid arm 37 of the tester. However, one or more strain gauges can be located at other locations on the suspension 133 or near the attachment of the suspension 133 and the rigid arm 37, and in other structural arrangements to provide an electrical output that adequately measures the friction force.

Figure 6:
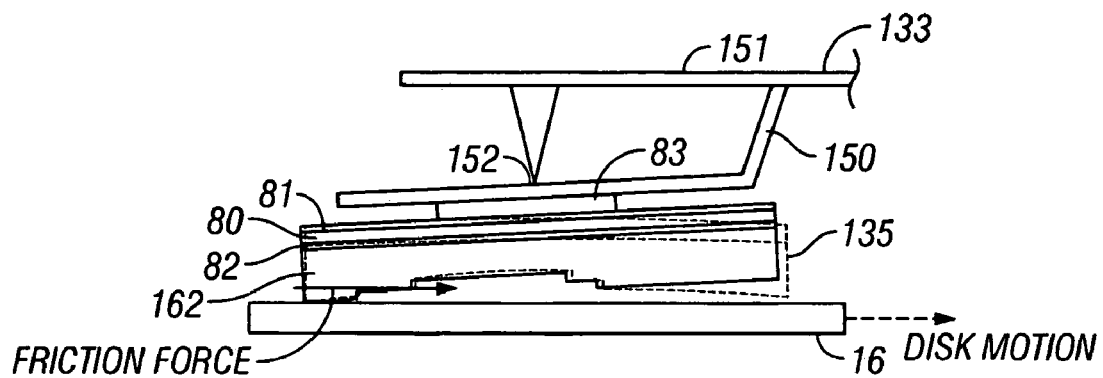
FIG. 6 shows a second embodiment of the tester wherein the friction-force sensor is a piezoelectric sensor.

FIG. 6 shows a second embodiment of the tester wherein the sensor 40 (FIG. 1) is a piezoelectric sensor. A piezoelectric element 80, such as lead zirconium titanate (PZT), with top and bottom electrodes 81, 82, respectively, is attached to the top side of slider 135. The element 80 is a thin (e.g., approximately 0.2 mm) layer of PZT material with lateral dimensions similar to those of the slider 135. A layer 83 of insulating material is located between the PZT element 80 and the flexure 150. The PZT element 80 and insulating layer 83 are attached to the flexure 150 and top side of the slider 135 with suitable adhesives, such as an epoxy. Electrical connections (not shown) are made to the top and bottom electrodes 81, 82. When the friction force acts on the slider leading portion 162, the slider body bends slightly, as represented by dashed lines in FIG. 6, stretching the PZT material. This generates a small voltage $V_{PZT}$ between the top and bottom electrodes 81, 82 that is measured by an external circuit (not shown). The relationship between $V_{PZT}$ and the friction force can be calibrated by several techniques, including the use of strain gauges, for example as shown in the embodiment of FIGS. 5A–5B. FIG. 6 shows the PZT element 80 attached to the top side of the slider, but other alternatives are possible, such as attachment on the suspension 133, preferably on the flexure 150.

Figure 7A:
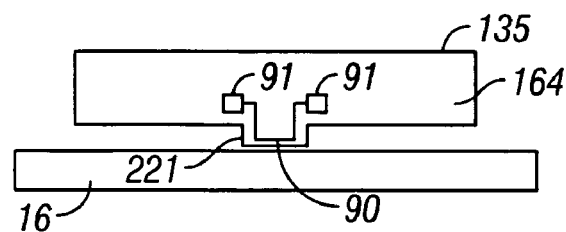
FIGS. 7A–7B are end and side views, respectively, showing a third embodiment of the tester wherein the friction-force sensor is a temperature sensor embedded in the slider.
Figure 7B:
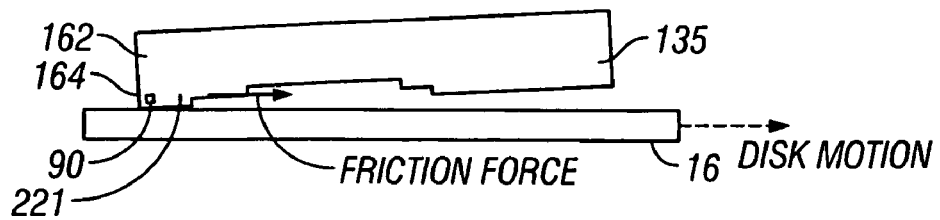

FIGS. 7A–7B are end and side views, respectively, showing a third embodiment of the tester wherein the sensor 40 (FIG. 1) is a temperature sensor 90 located on the slider 135. The temperature sensor 90 is depicted as being located on the contact pad 221 at the slider leading portion 162. For optimal sensitivity the temperature sensor 90 should be located as close as possible to the contacting portions of the pad 221. Other locations on the slider 135 for the temperature sensor 90 are possible, but may result in lower sensitivity to the friction force. The temperature sensor 90 is fabricated by first depositing an insulating material, such as alumina, onto the leading edge or surface 164 at the leading portion 162. Next a thin strip (e.g., with dimensions of less than about 100 nm thick, less than about 1 μm height, and less than about 10 μm length) of a metal alloy, whose resistance changes proportionally with temperature, is deposited. The closer the metal-alloy strip is located to the disk, the better is its sensitivity to temperature changes. Electrical connections to the temperature sensor 90 are then deposited to form leads 91 on leading surface 164. The leads should have dimensions to ensure that their electrical resistance is much less than the resistance of the sensor 90. Next, a film of insulating material, such as alumina, is deposited over leading surface 164, except over those areas where external wires will be bonded to the leads 91. A conventional magnetoresistive (MR) sensor, such as is used for read heads in magnetic recording disk drives, will function as temperature sensor 90, and the well-known MR materials and MR head fabrication processes can be used to form the temperature sensor on the slider.

When the contact pad 221 of the negative-pitch slider 135 rubs against the rotating disk 135, the power generated by frictional heating is given by F*v, where F is the friction force and v is the disk velocity. As the heat dissipates from the contact zone, a temperature gradient is created between the contact pad 221 and the rest of the slider body. The increase in temperature of the contact pad 221 from frictional heating is measured by the temperature sensor 90. Under steady state conditions the increase in temperature at the sensor is proportional to F*v. To measure the temperature, a constant current I is passed through the sensor, and the voltage drop $V_S$ across the sensor is measured to determine the sensor's resistance $R_S$ by the equation: $R_S = V_S/I$. When the slider is heated by the friction force, the sensor's resistance increases by an amount $\Delta R_S$ that is proportional to the temperature increase. The resistance increase $\Delta R_S$ results in a change $\Delta V_S$ in the voltage drop across the sensor. The relationship between $\Delta V_S$ and the friction force can be calibrated by several techniques, including the use of strain gauges, for example as shown in the embodiment of FIGS. 5A–5B. The calibration is done at a particular disk velocity v, which enables $\Delta V_S$ to be used to directly measure the friction force.

The successful operation of the tester with the negative-pitch slider and contact pad at its leading portion, as described above, was demonstrated using a laser-doppler-vibrometer (LDV) to measure bounce of the slider. The measured bounce was small (less than 1 nm mean-to-peak). This LDV data was consistent with low acoustic-emission (AE) measurements. High AE from the slider-disk interface during operation of a contact recording disk drive has been correlated with high probability of slider bounce.

Figure 8:
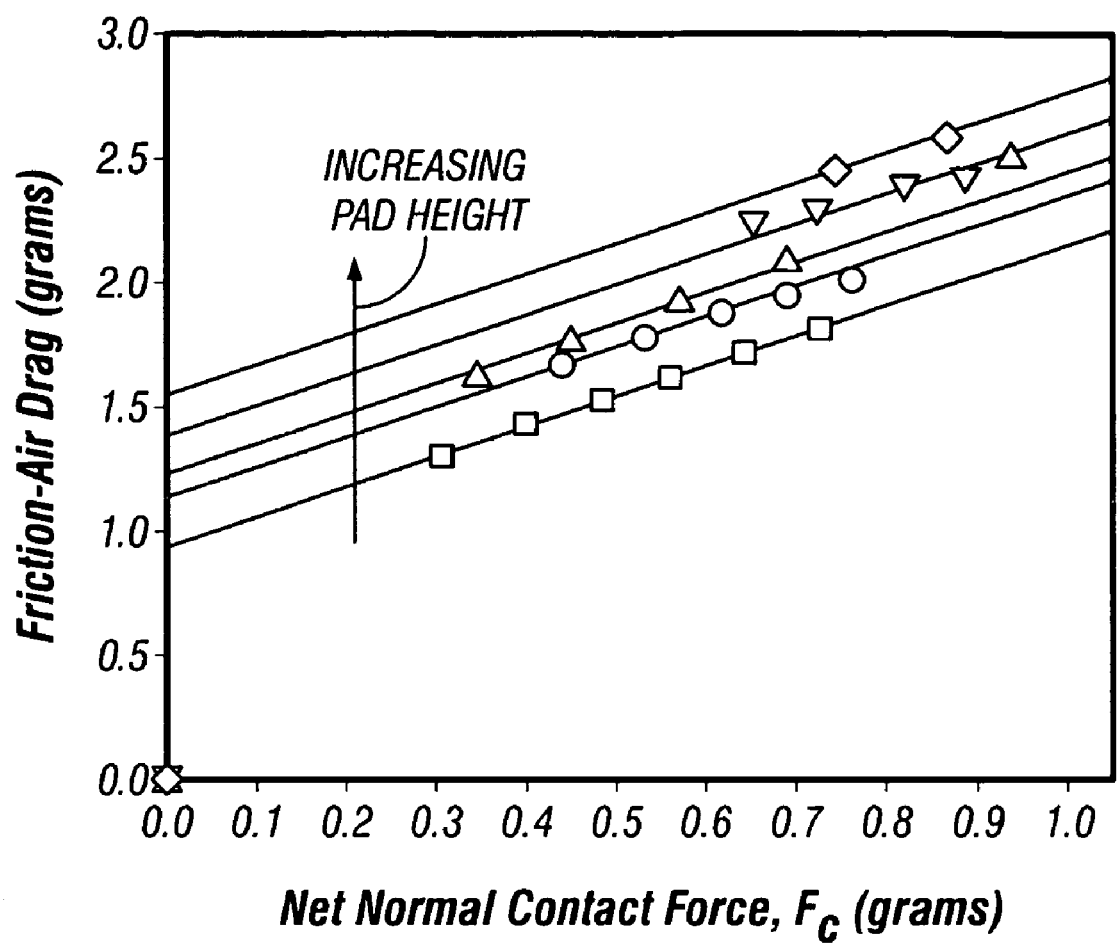
FIG. 8 is a graph showing measured friction force for small changes in height of the contact pad of the negative-pitch slider and illustrates use of the tester of the present invention to accurately measure the friction force and small changes in friction force.

The tester with the negative-pitch slider and contact pad at its leading portion, as described above, has been used to accurately measure small friction forces and small changes in friction force. FIG. 8 shows measured friction force (the Y-axis) for small changes in height of the contact pad 221. The measured friction forces are then used in a computer model to generate the net normal force (the X-axis) acting on the slider.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An apparatus for testing the interface of a slider and the surface of a disk, the apparatus comprising:
   a motor for rotating the disk about an axis substantially perpendicular to the surface of the disk;
   a slider support, the position of the slider support relative to the rotational axis of the disk along a line substantially parallel to the surface of the disk being adjustable;
   a slider having a leading portion, a trailing portion and a disk-facing surface between the leading and trailing portions, the slider being maintained by the support with its leading portion closer to the surface of the disk than its trailing portion when a disk is being rotated in a direction toward the leading portion of the slider; and
   a sensor for detecting the friction force between the slider and the disk when a disk is being rotated and the leading portion of the slider is in contact with the surface of the disk and the trailing portion is not in contact with the surface of the disk.

2. The apparatus of claim 1 further comprising a disk mounted to the motor.

3. The apparatus of claim 1 further comprising a base, the motor being fixed to the base and the slider support being attached to the base and movable on the base.

4. The apparatus of claim 3 wherein the slider support comprises a movable actuator and a suspension connecting the slider to the actuator, the suspension comprising a flexure attached to the slider and a load beam attached to the flexure and having a tip contacting the slider at a pivot point, the load beam applying a force to urge the leading portion of the slider to contact the disk when a disk is being rotated.

5. The apparatus of claim 4 wherein the slider has a contact pad on its leading portion for contacting a disk when a disk is being rotated.

6. The apparatus of claim 1 wherein the sensor is a strain gauge located on the slider support.

7. The apparatus of claim 1 wherein the sensor is a piezoelectric sensor located on the slider support.

8. The apparatus of claim 7 wherein the slider has a top surface opposite its disk-facing surface and wherein the piezoelectric sensor is located on the slider top surface.

9. The apparatus of claim 1 wherein the sensor is a temperature sensor located on the slider.

10. A slider-disk interface tester comprising:
    a base;
    a motor attached to the base;
    a disk mounted to the motor and rotatable by the motor about an axis substantially perpendicular to a surface of the disk;
    an actuator attached to the base and connected to the slider for positioning the slider to a radial location on the disk surface;
    a slider having a leading portion in contact with the disk and exposed to air flow induced by the disk when it is rotating and a trailing portion downstream from the leading portion and not in contact with the disk;
    a suspension connecting the slider to the actuator, the suspension comprising a flexure attached to the slider and a load beam attached to the flexure and having a tip contacting the slider at a pivot point, the load beam applying a force urging the leading portion of the slider into contact with the surface of the disk; and
    a sensor for detecting the friction force between the slider and the disk when it is rotating.

11. The tester of claim 10 wherein the slider has a contact pad on its leading portion, the contact pad being in contact with the disk.

12. The tester of claim 10 wherein the sensor is a sensor selected from the group consisting of a strain gauge, a piezoelectric sensor and a temperature sensor.

13. The tester of claim 10 wherein the sensor is a strain gauge attached to the suspension.

14. The tester of claim 10 wherein the slider has a disk-facing surface and a top surface opposite its disk-facing surface and wherein the sensor is a piezoelectric sensor located on the slider top surface.

15. The tester of claim 10 wherein the sensor is a temperature sensor located on the slider.

16. The tester of claim 10 wherein the slider has an air-bearing surface on each of the leading and trailing portions, the trailing portion gas-bearing surface being substantially larger than and substantially coplanar with the leading portion gas-bearing surface.

17. A slider-disk interface tester comprising:
    a base;
    a motor attached to the base;
    a disk mounted to the motor and rotatable by the motor about an axis substantially perpendicular to a surface of the disk;
    an actuator attached to the base and connected to the slider for positioning the slider to a radial location on the disk surface;
    a slider comprising (a) a leading portion facing the air flow when the disk is rotating, the leading portion having an air-bearing surface that faces the surface of the disk; (b) a trailing portion downstream from the leading portion and having an air-bearing surface that faces the surface of the disk, the trailing portion air-bearing surface being substantially larger than and substantially coplanar with the leading portion air-bearing surface; and (c) a contact pad on the leading portion and extending beyond the leading portion air-bearing surface for contacting the surface of the disk when the disk is rotating;

a suspension connecting the slider to the actuator, the suspension comprising a flexure attached to the slider and a load beam attached to the flexure and having a tip contacting the slider at a pivot point, the load beam applying a force urging the contact pad into contact with the surface of the disk; and a sensor for detecting the friction force between the slider and the disk when the disk is rotating, the sensor comprising a strain gauge connected to the suspension and electrical circuitry connected to the strain gauge for measuring a voltage output from the strain gauge.

18. The tester of claim 17 further comprising a rigid arm on the actuator and a pair of generally parallel planar cantilevers connecting the suspension with the rigid arm, the planes of the cantilevers being oriented generally perpendicular to the disk surface, and wherein the strain gauge comprises four strain gauges, each strain gauge being located on a respective surface of the two cantilevers.

* * * * *